(12) United States Patent
Brodersen et al.

(10) Patent No.: US 7,853,972 B2
(45) Date of Patent: Dec. 14, 2010

(54) MEDIA PREVIEW USER INTERFACE

(75) Inventors: Rainer Brodersen, San Jose, CA (US); Rachel Clare Goldeen, Mountain View, CA (US); Jeffrey Ma, Redwood City, CA (US); Mihnea Calin Pacurariu, Los Gatos, CA (US); Eric Taylor Seymour, San Jose, CA (US); Steven Jobs, Palo Alto, CA (US); David Alan Pound, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 11/530,630

(22) Filed: Sep. 11, 2006

(65) Prior Publication Data

US 2008/0066110 A1 Mar. 13, 2008

(51) Int. Cl.
*G06F 3/00* (2006.01)
*G06F 13/00* (2006.01)
*H04N 5/445* (2006.01)

(52) U.S. Cl. .............................. 725/40; 725/39; 725/52
(58) Field of Classification Search ............. 725/37–61; 715/729, 799, 726
See application file for complete search history.

(56) References Cited

U.S. PATENT DOCUMENTS

| | | | |
|---|---|---|---|
| 5,619,249 A * | 4/1997 | Billock et al. .................. | 725/5 |
| 5,717,879 A | 2/1998 | Moran et al. | |
| 5,822,123 A * | 10/1998 | Davis et al. ................... | 725/43 |
| 5,880,768 A | 3/1999 | Lemmons et al. | |
| 5,945,987 A * | 8/1999 | Dunn .......................... | 715/718 |
| 6,006,227 A | 12/1999 | Freeman et al. | |
| 6,335,737 B1 | 1/2002 | Grossman et al. | |
| 6,448,987 B1 | 9/2002 | Easty et al. | |
| 6,638,313 B1 | 10/2003 | Freeman et al. | |
| 6,725,427 B2 | 4/2004 | Freeman et al. | |
| 6,768,999 B2 | 7/2004 | Prager et al. | |
| 6,944,632 B2 | 9/2005 | Stern | |
| 7,292,243 B1 | 11/2007 | Burke | |
| 7,362,331 B2 | 4/2008 | Ording | |
| 7,363,591 B2 | 4/2008 | Goldthwaite et al. | |
| 7,743,341 B2 * | 6/2010 | Brodersen et al. ........... | 715/810 |
| 2002/0033848 A1 | 3/2002 | Sciammarella et al. | |
| 2002/0083469 A1 | 6/2002 | Jeannine et al. | |

(Continued)

FOREIGN PATENT DOCUMENTS

EP 1 469 375 A1 10/2004

(Continued)

OTHER PUBLICATIONS

U.S. Appl. No. 11/530,824, filed Sep. 11, 2006, Madden et al.

(Continued)

*Primary Examiner*—Scott Beliveau
*Assistant Examiner*—Alexander Q Huerta
(74) *Attorney, Agent, or Firm*—Fish & Richardson P.C.

(57) ABSTRACT

A menu having menu items is arranged in an interface environment. A first abstraction is arranged proximate to the menu, the first abstraction being based on a highlighted menu item. A second abstraction is transitioned into the interface environment upon the occurrence of an event, the second abstraction being proximate to the menu.

25 Claims, 6 Drawing Sheets

U.S. PATENT DOCUMENTS

| | | |
|---|---|---|
| 2002/0175931 A1 | 11/2002 | Holtz et al. |
| 2003/0110450 A1 | 6/2003 | Sakai |
| 2003/0117425 A1 | 6/2003 | O'Leary et al. |
| 2003/0142751 A1 | 7/2003 | Hannuksela |
| 2003/0174160 A1 | 9/2003 | Deutscher et al. |
| 2004/0008211 A1 | 1/2004 | Soden et al. |
| 2004/0100479 A1 | 5/2004 | Nakano et al. |
| 2004/0140995 A1 | 7/2004 | Goldthwaite et al. |
| 2004/0150657 A1 | 8/2004 | Wittenburg et al. |
| 2004/0221243 A1 | 11/2004 | Twerdahl et al. |
| 2004/0250217 A1 | 12/2004 | Tojo et al. |
| 2004/0261031 A1 | 12/2004 | Tuomainen et al. |
| 2005/0041033 A1 | 2/2005 | Hilts |
| 2005/0044499 A1 | 2/2005 | Allen et al. |
| 2005/0091597 A1 | 4/2005 | Ackley |
| 2005/0160375 A1 | 7/2005 | Sciammarella et al. |
| 2005/0246654 A1 | 11/2005 | Hally et al. |
| 2005/0278656 A1 | 12/2005 | Goldthwaite et al. |
| 2006/0020962 A1 | 1/2006 | Stark et al. |
| 2006/0031776 A1 | 2/2006 | Glein et al. |
| 2006/0265409 A1 | 11/2006 | Neumann et al. |
| 2007/0162853 A1 | 7/2007 | Weber et al. |
| 2007/0288863 A1 | 12/2007 | Ording et al. |
| 2008/0052742 A1* | 2/2008 | Kopf et al. .................... 725/34 |
| 2008/0062894 A1* | 3/2008 | Ma et al. .................... 370/263 |
| 2008/0065638 A1* | 3/2008 | Brodersen et al. .............. 707/7 |
| 2008/0065720 A1 | 3/2008 | Brodersen et al. |
| 2008/0066010 A1* | 3/2008 | Brodersen et al. ........... 715/810 |
| 2008/0066013 A1 | 3/2008 | Brodersen et al. |
| 2008/0092168 A1* | 4/2008 | Logan et al. .................. 725/44 |
| 2008/0122870 A1 | 5/2008 | Brodersen et al. |
| 2008/0263585 A1* | 10/2008 | Gell et al. ..................... 725/32 |
| 2009/0282372 A1* | 11/2009 | Jerding et al. ............... 715/867 |
| 2010/0077338 A1* | 3/2010 | Matthews et al. ........... 715/779 |

FOREIGN PATENT DOCUMENTS

| | | |
|---|---|---|
| EP | 1 510 911 A2 | 3/2005 |

OTHER PUBLICATIONS

USPTO Final Office Action in U.S. Appl. No. 11/530,824, mailed May 8, 2009.

USPTO Final Office Action in U.S. Appl. No. 11/530,808 mailed May 13, 2009.

USPTO Final Office Action in U.S. Appl. No. 11/530,643, mailed Jun. 5, 2009.

"Fading Image Rollovers," http://web.archive.org/web/20060111080357/http://www.javascript-fx.com/fade_rollovers/general_help/help.html. Jan. 11, 2006, 1 page.

"Animated Image Blur," http://web.archive.org/web/20060430062528/http://www.tutorio.com/tutorial/animated-image-blur, Apr. 30m, 2006, 2 pages.

* cited by examiner

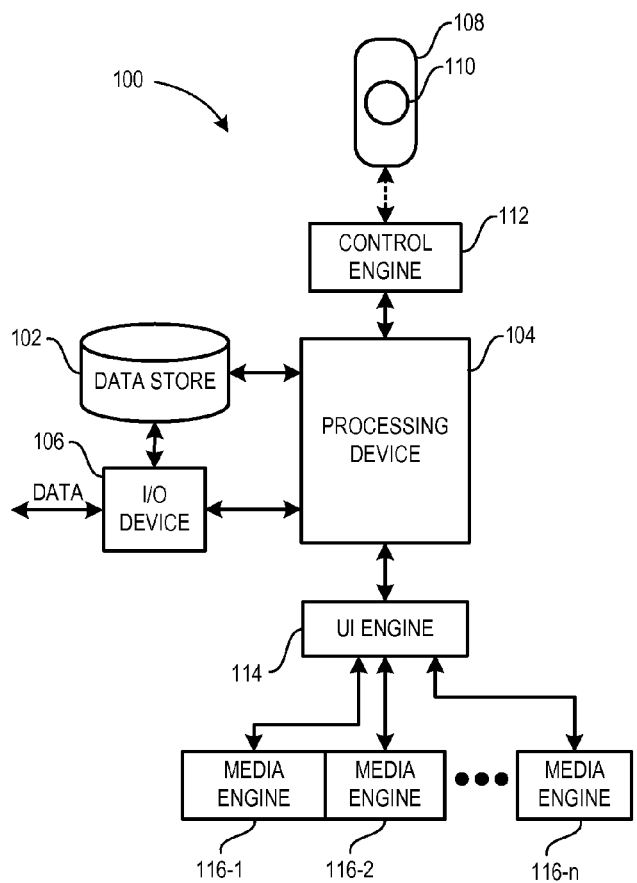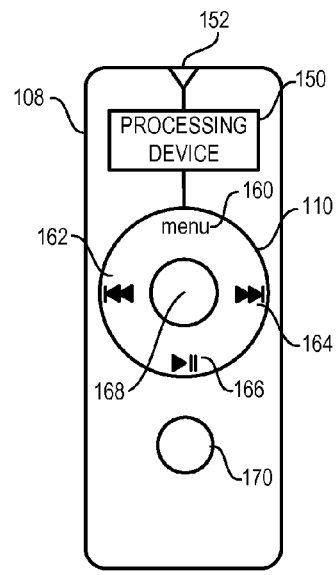
FIG. 1
FIG. 2
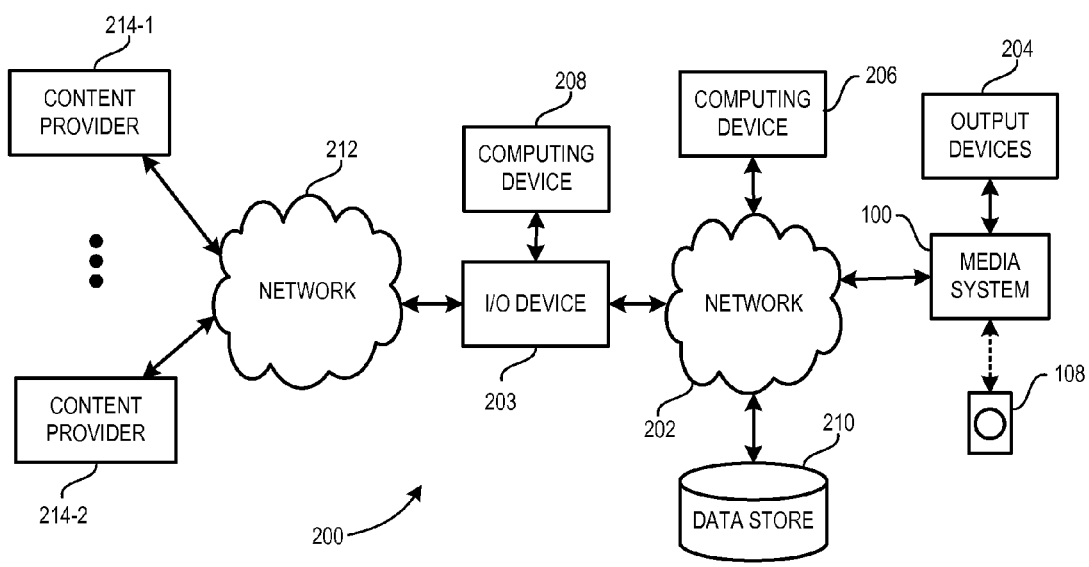
FIG. 3

US 7,853,972 B2

MEDIA PREVIEW USER INTERFACE

BACKGROUND

This disclosure is related to media processing systems and methods.

Media devices, such as digital video and audio players, can include multiple functions and capabilities, such as playing stored content, browsing and selecting from recorded content, storing and/or receiving content selected by a user, and the like. These various functions can often be grouped according to content types, e.g., movies, music, television programs, photos, etc. The user interface can include both graphical and textual features. It is desirable that the user interface conveys information to the user in an intuitive manner, and readily provides access to various features. One such feature is a media preview feature. However, current media devices provide inadequate information regarding content and/or poorly organize the information that is provided in preview features.

SUMMARY

Disclosed herein are systems and methods for previewing content associated with menu items. In one implementation, an interface environment includes a menu arranged in the interface environment, the menu including a list of menu items associated with corresponding content. The interface environment further includes a first abstraction of a highlighted menu item, the first abstraction being proximate to the menu. The interface environment is further configured to transition to include a second abstraction of the highlighted menu item based upon an event, the second abstraction being proximate to the menu.

In another implementation, one or more computer readable media are used to cause a processor to perform the operations comprising: generating a display environment comprising a menu, the menu comprising a plurality of menu items including a highlighted menu item, each of the menu items associated with corresponding content; generating a first abstraction arranged within the display environment, the first abstraction being associated with the highlighted menu item; receiving an event; and, transitioning the first abstraction to a second abstraction responsive to the event, the second abstraction being associated with the highlighted menu item.

BRIEF DESCRIPTION OF THE DRAWINGS

FIG. 1 is a block diagram of an example media processing system.

FIG. 2 is a block diagram of an example remote control device for the media processing system.

FIG. 3 is an example network environment in which a media processing system in accordance with FIG. 1 can be implemented.

DETAILED DESCRIPTION

Figure 4:
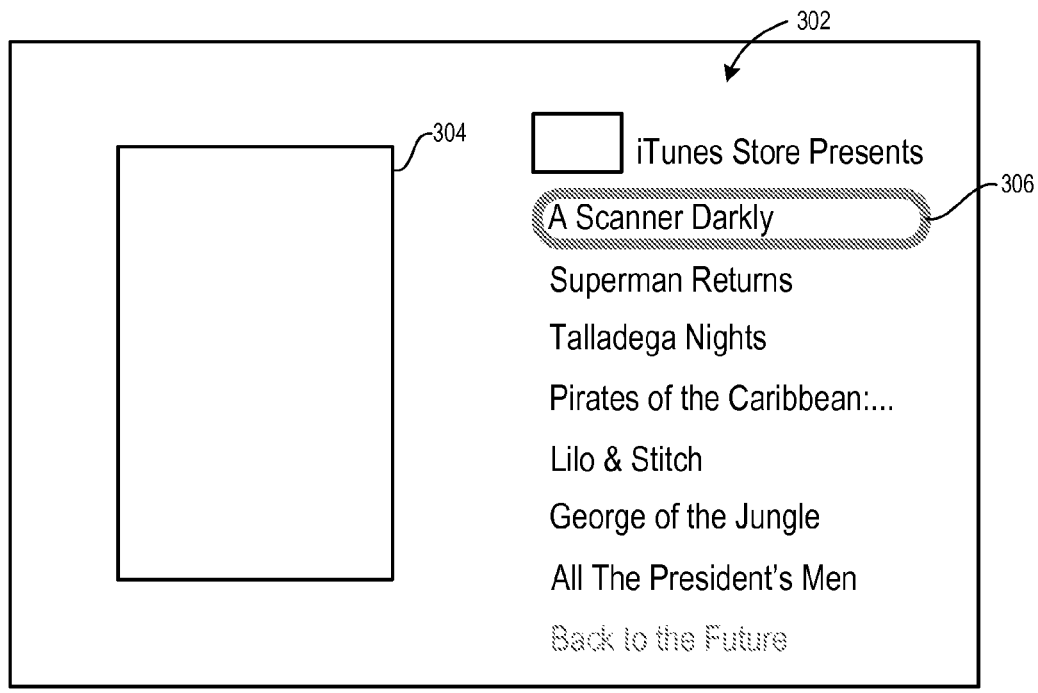
FIG. 4 is a block diagram of an example interface environment.

FIG. 1 is a block diagram of an example media processing system 100. The media processing system 100 can transmit and receive media data and data related to the media data. The media data can be stored in a data store 102, such as a memory device, and be processed by a processing device 104 for output on a display device, such as a television, a computer monitor, a game console, a hand held portable device, and the like, and/or an audio device, such as a multi-channel sound system, a portable media player, a computer system, and the like. The media processing system 100 may be used to process media data, for example, video data and audio data received over one or more networks by an input/output (I/O) device 106. Such media data may include metadata, e.g., song information related to audio data received, or programming information related to a television program received.

The media data and related metadata may be provided by a single provider, or may be provided by separate providers. In one implementation, the media processing system 100 can be configured to receive media data from a first provider over a first network, such as a cable network, and receive metadata related to the video data from a second provider over a second network, such as a wide area network (WAN). Example media data include video data, audio data, content payload data, or other data conveying audio, textual and/or video data.

In another implementation, the media processing system 100 can be configured to receive media data and metadata from a computing device, such as a personal computer. In one example of this implementation, a user manages one or more media access accounts with one or more content providers through the personal computer. For example, a user may manage a personal iTunes® account with iTunes® software, available from Apple Computer, Inc. Media data, such as audio and video media data, can be purchased by the user and stored on the user's personal computer and/or one or more data stores. The media data and metadata stored on the personal computer and/or the one or more data stores can be selectively pushed and/or pulled for storage in the data store 102 of the media processing system 100.

In another implementation, the media processing system 100 can be used to process media data stored in several data stores in communication with a network, such as wired and/or wireless local area network (LAN), for example. In one implementation, the media processing system 100 can pull and/or receive pushed media data and metadata from the data stores over the network for presentation to a user. For example, the media processing system 100 may be implemented as part of an audio and video entertainment center having a video display device and an audio output device, and can pull media data and receive pushed media data from one or more data stores for storage and processing. At the entertainment center, a user can, for example, view photographs that are stored on a first computer while listening to music files that are stored on a second computer.

In one implementation, the media processing system 100 includes a remote control device 108. The remote control device 108 can include a rotational input device 110 configured to sense touch actuations and generate remote control signals therefrom. The touch actuations can include rotational actuations, such as when a user touches the rotational input device 110 with a digit and rotates the digit on the surface of the rotational input device 110. The touch actuations can also include click actuations, such as when a user presses on the rotational input device 110 with enough pressure to cause the remote control device 108 to sense a click actuation.

In one implementation, the functionality of the media processing system 100 is distributed across several engines. For example, the media processing system 100 may include a controller engine 112, a user interface (UI) engine 114, and one or more media engines 116-1, 116-2, and 116-n. The engines may be implemented in software as software modules or instructions, or may be implemented in hardware, or in a combination of software and hardware.

The control engine 112 is configured to communicate with the remote control device 108 by a link, such as a wireless infrared signal or radio frequency signal. The remote control device 108 can transmit remote control signals generated, for example, from touch actuations of the rotational input device 110 to the control engine 112 over the link. In response, the control engine 112 is configured to receive the remote control signals and generate control signals in response. The control signals are provided to the processing device 104 for processing.

The control signals generated by the control engine 112 and processed by the processing device 104 can invoke one or more of the UI engine 114 and media engines 116-1-116-n. In one implementation, the UI engine 114 manages a user interface to facilitate data presentation for the media engines 116-1-116-n and functional processing in response to user inputs.

In one implementation, the media engines 116 can include one or more content-specific engines, such as a movies engine, television program engine, music engine, and the like. Each engine 116 can be instantiated to support content-specific functional processing. For example, a movie engine to support movie-related functions can be instantiated by selecting a "Movies" menu item. Example movie-related functions include purchasing movies, viewing movie previews, viewing movies stored in a user library, and the like. Likewise, a music engine to support music-related functions can be instantiated by selecting a "Music" menu item. Example music-related functions include purchasing music, viewing music playlists, playing music stored in a user library, and the like.

The media processing system 100 of FIG. 1 can also implement different functional distribution architectures that have additional functional blocks or fewer functional blocks. For example, the engines 116 can be implemented in a single monolithic engine.

FIG. 2 is a block diagram of an example remote control device 108 for the media processing system 100. The remote control device 108 includes a rotational input device 110, a processing device 150, and a wireless communication subsystem 152. The rotational input device 110 defines a surface that can sense a touch actuation, such as the presence of a finger on the surface, and can further generate a control signal based on a rotation of the finger on the surface. In one implementation, a touch sensitive array is disposed beneath the surface of the rotational input device 110. The touch sensitive array can be disposed according to polar coordinates, i.e., r and ?, or can be disposed according to Cartesian coordinates, i.e., x and y.

The rotational input device areas 160, 162, 164, 166 and 168 are receptive to press actuations. In one implementation, the areas include a menu area 160, a reverse/previous area 162, a play/pause area 164, a forward/next area 166, and a select area 168. The areas 160-168, in addition to generating signals related to their descriptive functionalities, can also generate signals for context-dependent functionality. For example, the menu area 160 can generate signals to support the functionality of dismissing an onscreen user interface, and the play/pause area 164 can generate signals to support the function of drilling down into a hierarchal user interface. In one implementation, the areas 160-168 comprise buttons disposed beneath the surface of the rotational input device 110. In another implementation, the areas 160-168 comprise pressure sensitive actuators disposed beneath the surface of the rotational input device 110.

The processing device 150 is configured to receive the signals generated by the rotational input device 110 and generate corresponding remote control signals in response. The remote control signals can be provided to the communication subsystem 152, which can wirelessly transmit the remote control signals to the media processing system 100.

Although shown as comprising a circular surface, in another implementation, the rotational input device 110 can comprise a rectangular surface, a square surface, or some other shaped surface. Other surface geometries that accommodate pressure sensitive areas and that can sense touch actuations may also be used, e.g., an oblong area, an octagonal area, etc.

Other actuation area configurations may also be used. For example, in another implementation, the remote control device 108 can also include a separate actuation button 170. In this implementation, the areas comprise a "+" or increase area 160, a reverse/previous area 162, a "−" or decrease area 164, a forward/next area 166, a play/pause area 168, and a menu area 170.

FIG. 3 is an example network environment 200 in which a media processing system 100 in accordance with FIG. 1 may be implemented. The media processing system 100 receives, for example, user input through a remote control device 108 and media data over a network 202, such as a wired or wireless LAN. In one implementation, the network 202 communicates with a wide area network 212, such as the Internet, through an I/O device 203, such as a router, server, cable modem, or other computing and/or communication processing device. The media processing system 100 processes the media data for output to one or more output devices 204. The media processing system 100 can receive the media data from one or more data stores connected to the network 202, such as computing devices 206 and 208, and a data store 210.

The media data can be received through the network 212 by one of the computing devices, such as computing device 208. The network 212 can include one or more wired and wireless networks, such as the Internet. The media data is provided by one or more content providers 214. For example, the content provider 214-1 may provide media data that is processed by the media processing system 100 and output through the output devices 206, and the content provider 214-2 may provide metadata related to the media data for processing by the media processing system 100. Such metadata may include episodic content, artist information, and the like. A content provider 214 can also provide both media data and related metadata.

In one implementation, the media processing system 100 can also communicate with one or more content providers 214 directly. For example, the media processing system 100 can communicate with the content providers the wireless network 202, the I/O device 203, and the network 212. The media processing system 100 can also communicate with the content providers 214 thorough other network configuration, e.g., through a direct connection to a cable modem, through a router, or through one or more other communication devices. Example communications can include receiving sales information, preview information, or communications related to commercial transactions, such as purchasing audio files and video files.

In another implementation, the media processing system 100 can receive content from any of the computing devices 206 and 208, and other such computing devices or data stores 210 available on the network 202 through sharing. Thus, if any one or more of the computing devices or data stores are unavailable, media data and/or meta data one the remaining computing devices or other such computing devices or data stores can still be accessed.

FIG. 4 is a block diagram of an example interface environment 300. The interface environment 300 can include a menu 302 arranged within the interface environment. The menu 302 can include any number of menu items, and can be arranged, for example, on the right side of the interface environment 300. However, in other examples the menu 302 can be arranged in other ways within the interface environment 300. The menu items can correspond to available content (e.g., downloadable content, stored content, etc.), whereby selection of a menu item can cause the media system 100 to present the content.

The interface environment 300 can also have a menu item abstraction 304 arranged within the interface environment 300. The menu item abstraction 304 can be selected based upon an association with a highlighted menu item 306. In some implementations, the menu item abstraction can be a first abstraction 304. The first abstraction can be, for example, a digital representation of art associated with the movie. In various examples, art can include one or more movie posters, one or more productions stills, or any other promotional material, or combinations thereof. The type of menu item abstraction displayed can depend on the type of content associated with the highlighted menu item 306. For example, if the content is a movie, then the menu item abstractions can be digital representations of movie posters or movie stills or thumbnail associated with a portion of video content. Likewise, if the content is audio books, then the menu item abstractions can be digital representations of book jackets. Other menu item abstractions can also be displayed dependent upon the content associated with the highlighted menu item 306. For example, a menu item abstraction for a photo can include a representative photo associated with a group of photos, or a collage of the group of photos. In other examples, a menu item abstraction for audio content can include an album cover art or related still.

Figure 5:
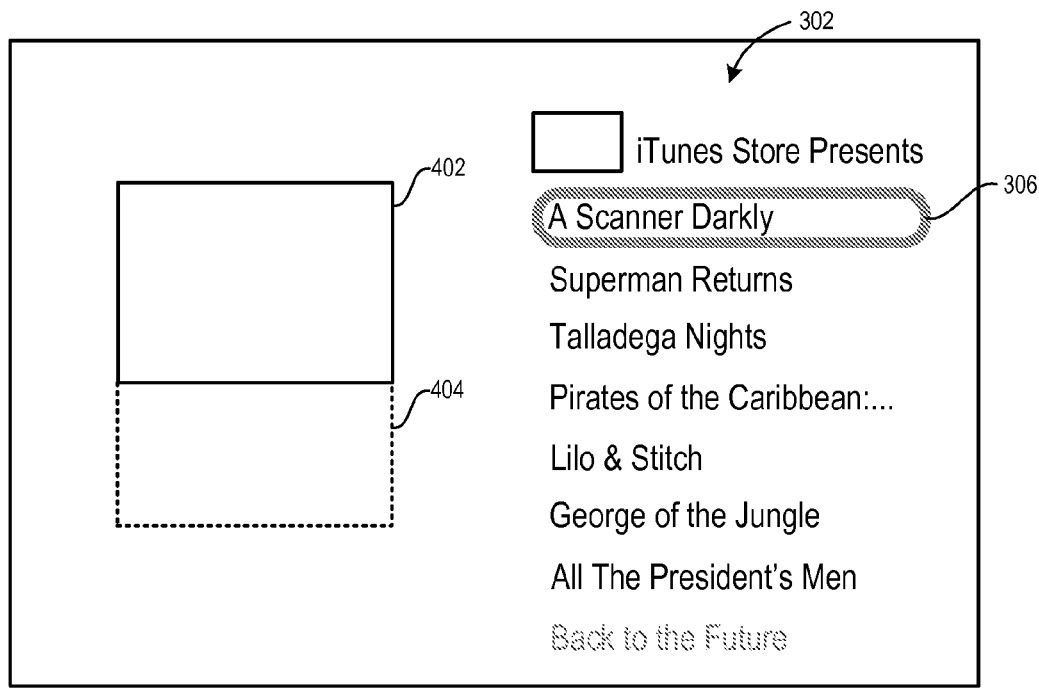
FIG. 5 is block diagram of an example preview interface environment.

FIG. 5 is block diagram of another example interface environment 400. In some implementations, the interface environment 400 results from a user highlighting a menu item 306 from the menu 302 for a predetermined period of time (e.g., more than a few seconds). A transition between the interface environment 300 of FIG. 4 and the interface environment 400 of FIG. 5 can include wiping out the menu item abstraction 304 of FIG. 4 and wiping in menu item abstractions 402, 404 of FIG. 5. In other implementations, the transition can include fading out of the abstraction 304 of FIG. 4 and fading in the abstractions 402, 404 of FIG. 5. In still further implementations, the interface environment 400 can be used instead of the interface environment 300 of FIG. 4. Other animations or transitions between the interface environments can be used in various example implementations.

The interface environment 400 can include the menu 302 arranged within the interface environment 400. The interface environment 400 can further include the menu item abstractions 402, 404 associated with a highlighted menu item 306. A first abstraction 402 can include a digital representation of promotional media (e.g., movie poster(s), preview(s), production stills, etc.). In this example, the first abstraction 402 is a preview (e.g., a movie trailer, episode clip, etc.) associated with the highlighted menu item 306. A second abstraction 404 can include additional information associated with the content related to the highlighted menu item 306. In various examples, the additional information can include metadata about the content associated with the highlighted menu item 306. The metadata in various examples can include any of actor(s), director(s), producer(s), genre(s), summary description, a recommended minimum maturity level (e.g., Motion Picture Association of America (MPAA) rating) associated with the content, critical review(s), release date(s), episode title, episode number, audio or video format, movie poster(s), production still(s), duration or length, along with subsets and combinations thereof.

Figure 6:
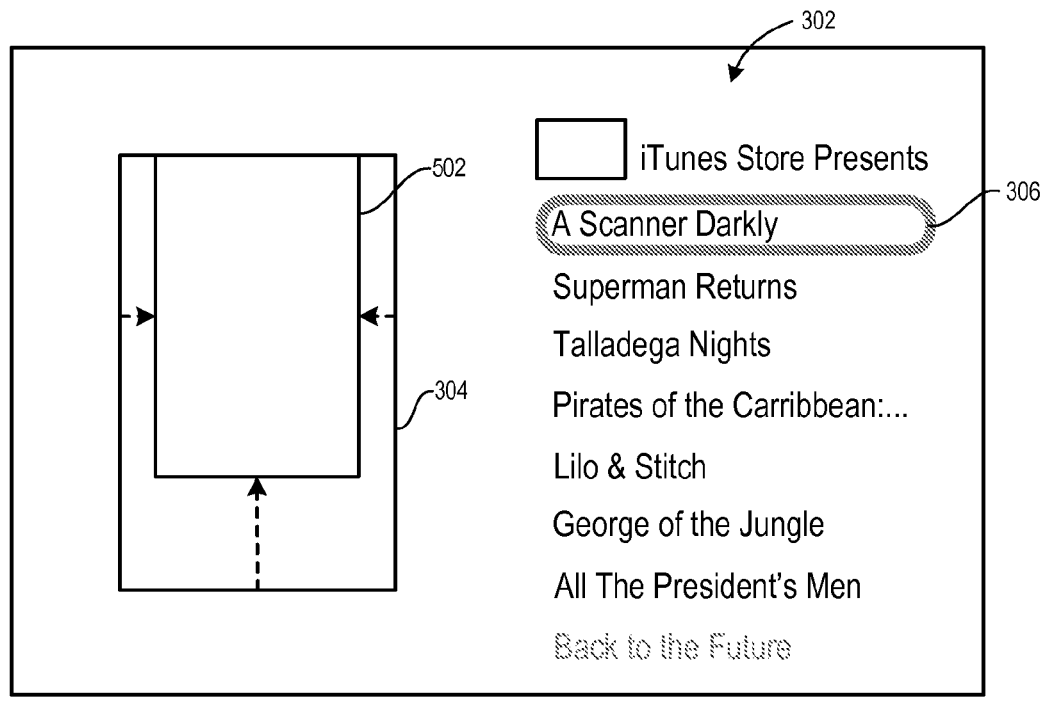
FIGS. 6 and 7 are block diagrams of an example interface environment transition.
Figure 7:
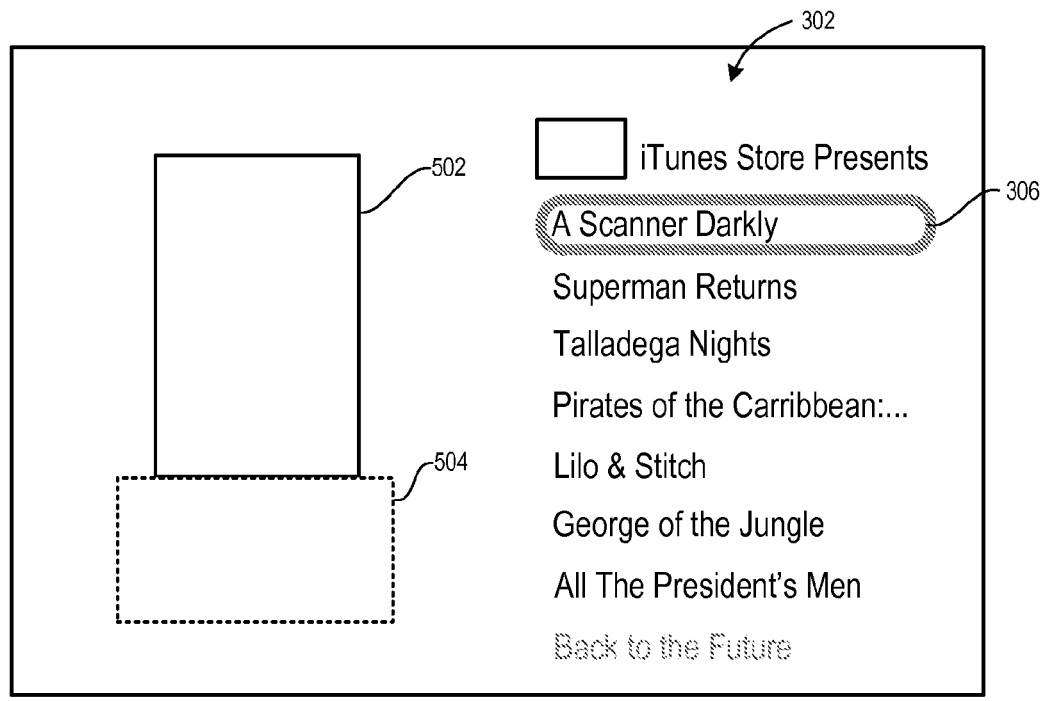

FIGS. 6 and 7 are block diagrams depicting an example interface environment transition. In some implementations, the interface environment 300 of FIG. 4 can transition to a preview interface environment 500 of FIGS. 6 and 7 by scaling a first abstraction 304 to a scaled first abstraction 502 based upon an event. As an example, the scaling can be performed by one or more of the media engines 116-1, 116-2, 116-n of FIG. 1, such as, for example, a presentation engine that can be configured to receive data and render menus and other graphics for display on a display device.

The event causing the transition between user interface 300 of FIG. 4 and user interface 500 of FIGS. 6 and 7, for example, can be a highlighting of a menu item for a predetermined period of time (e.g., a few seconds). Alternatively, the event can be based upon input (e.g., a request, a selection, etc.) received from the user. During and following the transition, the menu 302 of FIG. 4 and list of menu items can remain arranged within the interface environment 500 as they were in the interface environment 300 of FIG. 4. Selection of a menu item from the interface environment 500 can cause a media system 100 to present content associated with the selected menu item.

FIG. 7 is block diagram of another example of the interface environment 500. As mentioned above, the interface environment 300 of FIG. 4 can transition to a preview interface environment 500 of FIGS. 6 and 7 by scaling a first abstraction 304 to a scaled first abstraction 502 based upon, for example, an event. After scaling the first abstraction, a second abstraction 504 can be transitioned into the interface environment 500 of FIG. 7. As an example, the transition of the second abstraction 504 into the interface environment 500 can be performed by a media engine 116-1, 116-2, 116-n, such as, for example, a presentation engine.

Transitioning the second abstraction 504 into the interface environment 500 can include a fade-in, a wipe-in, pixilation in, or a reveal from behind the first abstraction, among many other types of transitions. In various examples, the transition can be based upon a preference received from a user for a particular kind of transition selected from multiple types of transitions. The preference can be received, for example, through a user interface.

As an example, the second abstraction 504 can include additional information associated with a highlighted menu item 306. In some implementations, the additional information can be metadata associated with the highlighted menu item 306. Metadata in various instances can include any of any of actor(s), director(s), producer(s), genre(s), summary description, a recommended minimum maturity level (e.g., Motion Picture Association of America (MPAA) rating) associated with the content, critical review(s), release date(s), episode title, episode number, audio or video format, movie poster(s), production still(s), along with subsets and combinations thereof. In further examples, the second abstraction 504 may include a preview (e.g., theatrical trailer, episode highlights, etc.) of the highlighted menu item 306.

Figure 8:
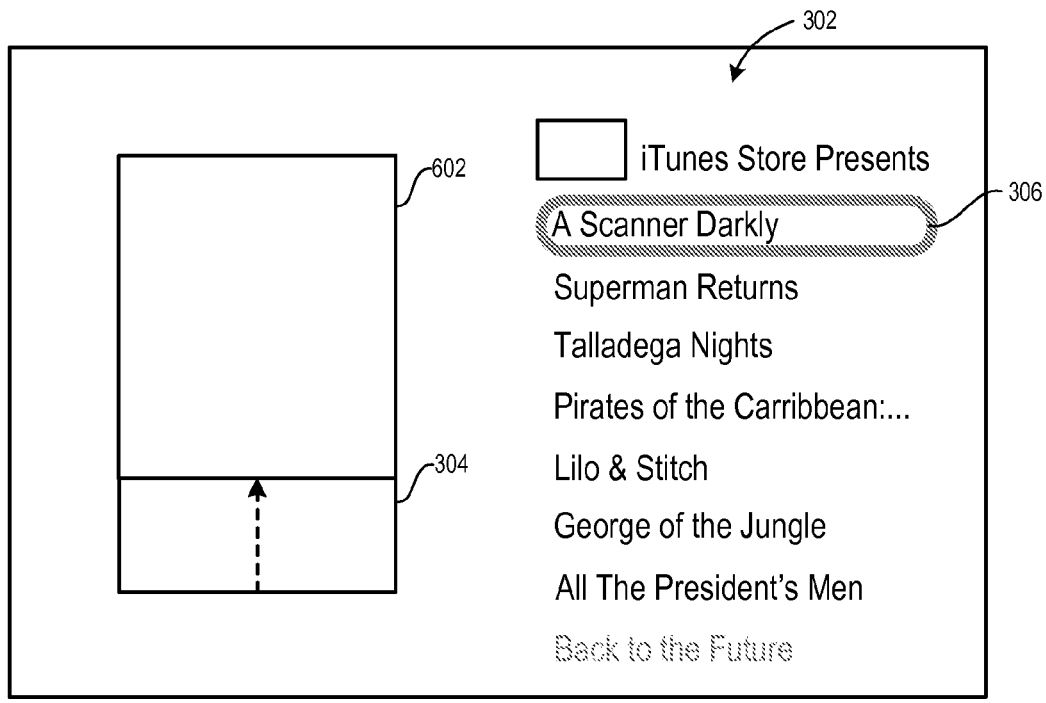
FIGS. 8 and 9 are block diagrams of another example media menu interface environment transition.
Figure 9:
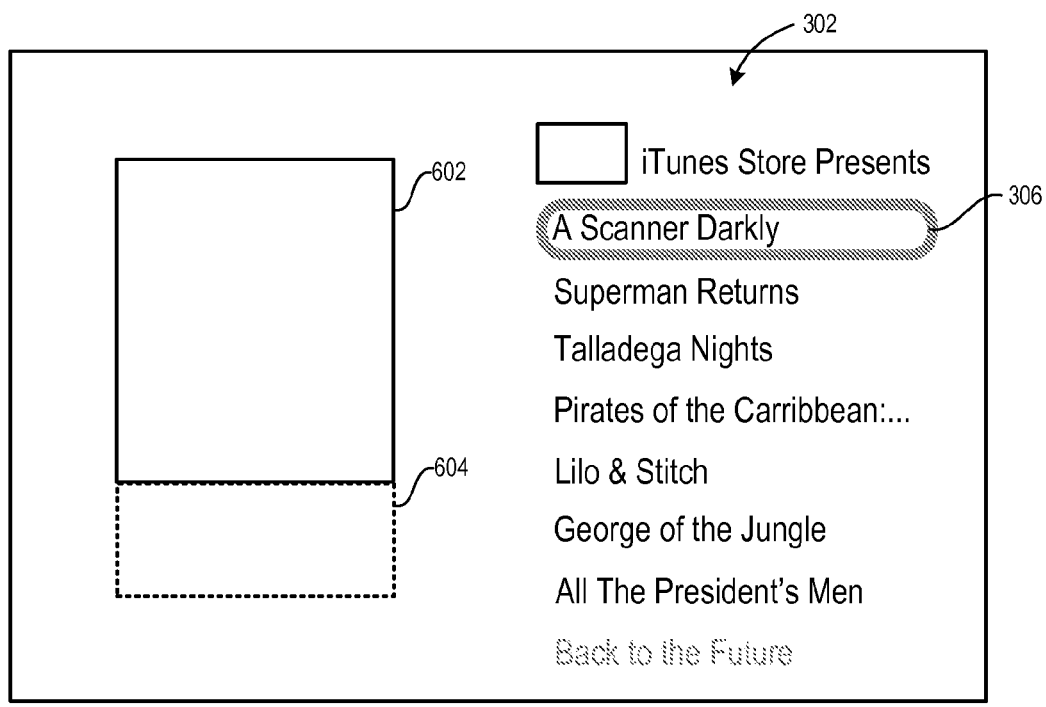

FIGS. 8 and 9 are block diagrams depicting another example interface environment transition. In some implementations, the interface environment 300 of FIG. 4 can transition to a preview interface environment 600 of FIGS. 8 and 9 by scaling a first abstraction 304 to a scaled first abstraction 602 based upon an event. As an example, the scaling can be performed by a media engine 116-1, 116-2, 116-n, such as, for example, a presentation engine.

The event causing the transition between user interface 300 of FIG. 4 and user interface 600 of FIGS. 8 and 9, for example, can be a highlighting of a menu item for a period of time (e.g., a few seconds). Alternatively, the event can be based upon input (e.g., a request, a selection, etc.) received from the user. During and following the transition, the menu 302 of FIG. 4 and list of menu items can remain arranged within the interface environment 600 as they were in the interface environment 300 of FIG. 4. Selection of a menu item from the interface environment 300 can cause a media system 100 to present content associated with the selected menu item.

FIG. 9 is block diagram of another example interface environment 600. As mentioned above, the interface environment 300 of FIG. 4 can transition to a preview interface environment 300 of FIGS. 8 and 9 by scaling a first abstraction 304 to a scaled first abstraction 602 based upon an event. After scaling the first abstraction 304, a second abstraction 604 can be transitioned into the interface environment 600 of FIG. 9. As an example, the transition of the second abstraction 604 into the interface environment 600 can be performed by a media engine 116-1, 116-2, 116-n, such as, for example, a presentation engine.

Transitioning the second abstraction 604 into the interface environment 600 can include any of a number of different types of transitions (e.g., fade-in, pixilation in, wipe-in, reveal, page turn, etc.). In various examples, the transition can be based upon a preference received from a user for a particular kind of transition selected from multiple types of transitions. The preference can be received, for example, through a user interface engine 114.

As an example, the second abstraction 604 can include additional information associated with a highlighted menu item 306. In some implementations, the additional information can be metadata associated with the highlighted menu item 306. Metadata in various instances can include any of any of actor(s), director(s), producer(s), genre(s), summary description, a recommended minimum maturity level (e.g., Motion Picture Association of America (MPAA) rating) associated with the content, critical review(s), release date(s), episode title, episode number, audio or video format, movie poster(s), production still(s), along with subsets and combinations thereof. In further examples, the second abstraction 604 may include a preview (e.g., theatrical trailer, episode highlights, etc.) of the highlighted menu item 306.

Figure 10:
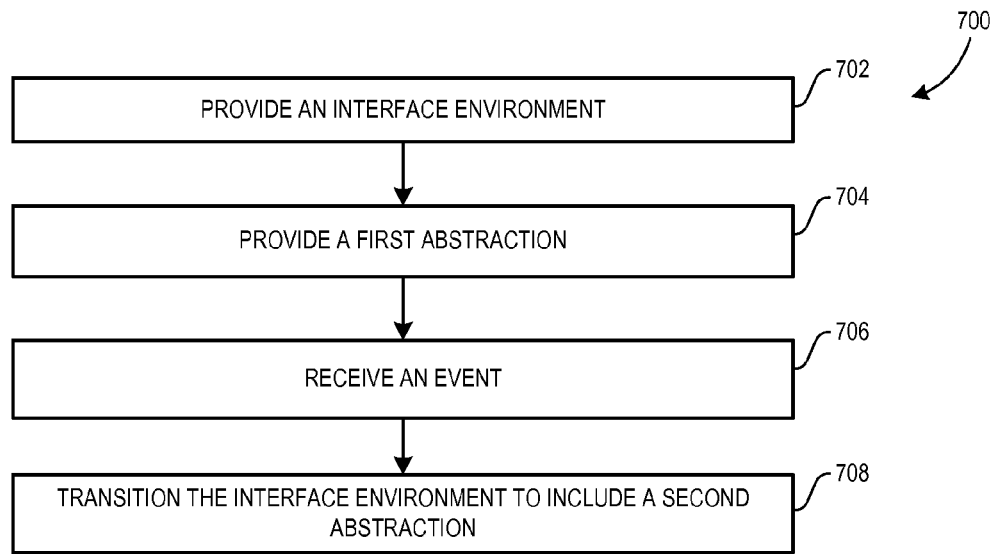
FIGS. 10-12 are flow diagrams of example media presentation processes.

FIG. 10 is a flow diagram of an example media menu presentation process 700. In step 702, an interface environment is provided. The interface environment (e.g., the interface environment of FIGS. 4-9) can include a menu having a plurality of menus arranged within the interface environment. Step 702 can be provided, for example, by one or more of the media engines 116-1, 116-2, 116-n of FIG. 1, such as a presentation engine configured to receive data and render menus and other graphics for display on a display device.

In step 704, a first abstraction (e.g., abstraction 304 of FIG. 4) is provided. As an example, step 704 may be performed by one or more of the media engines 116-1, 116-2, 116-n, such as for example a presentation engine. The first abstraction is typically related to a highlighted menu item 306 of FIGS. 4-9. In various examples, the first abstraction can include digital representation of promotional media associated with the content, such as movie poster(s), production still(s), metadata, movie trailer(s), video clips, etc.

In step 706, an event is received. As an example, the event can be received through the user interface engine 114 of FIG. 1. Alternatively, the event may be generated by one or more of the media engines 116-1, 116-2, 116-n. In various implementations, the event can include an extended pause (e.g., a few seconds) on a particular menu item, or a preview selection received from the user through a user interface engine 114 of FIG. 1, among many others.

In step 708, the interface environment is transitioned to include a second abstraction. As an example, the interface environment can be transitioned using one or more of the media engines 116-1, 116-2, 116-n, such as a presentation engine configured to render menus and other graphics within a display environment for display on a display device. In various implementations, the transition can include a fade, a wipe, a pixilation, a reveal, or a page turn, among many others.

Figure 11:
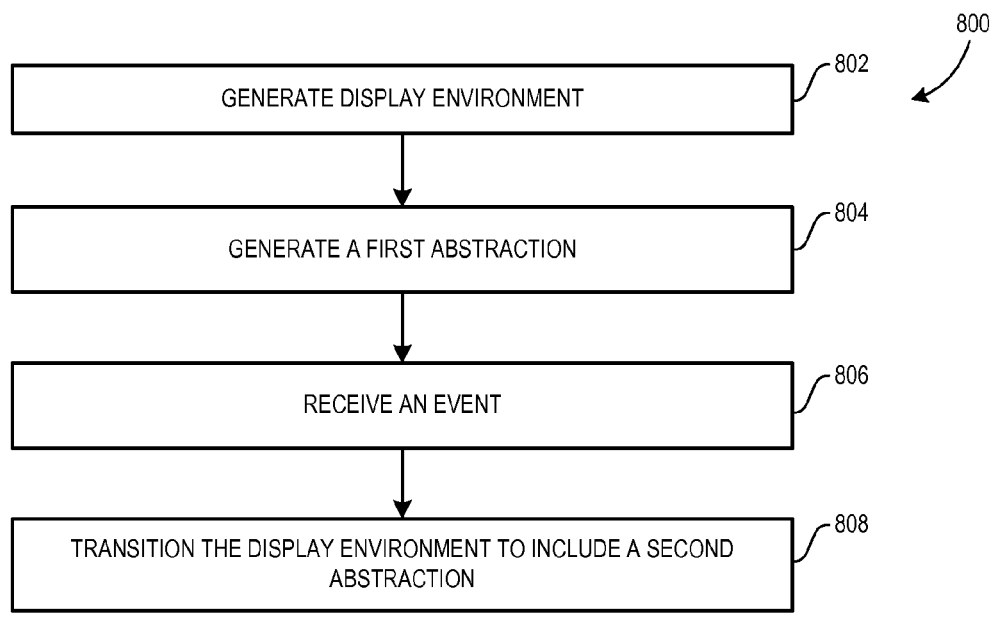

FIG. 11 is a flow diagram of an example media menu presentation process 800. In step 802, a display environment (e.g., interface environment 300 of FIGS. 4-9) is generated. The display environment can include a menu having a plurality of menus arranged within the display environment. Step 802 can be provided, for example, by one or more of the media engines 116-1, 116-2, 116-n of FIG. 1, such as a presentation engine.

In step 804, a first abstraction (e.g., abstraction 304 of FIG. 4) is generated. As an example, step 804 may be performed by one or more of the media engines 116-1, 116-2, 116-n, such as a presentation engine. The first abstraction is typically related to a highlighted menu item 306 of FIGS. 4-9. In various examples, the first abstraction can include digital representation of promotional media associated with the content, such as movie poster(s), production still(s), metadata, movie trailer(s), video clips, etc.

In step 806, an event is received. As an example, the event can be received through the user interface engine 114 of FIG. 1. Alternatively, the event may be generated by one or more of the media engines 116-1, 116-2, 116-n. In various implementations, the event can include an extended pause (e.g., a few seconds) on a particular menu item, or a preview selection received from the user through a user interface engine 114 of FIG. 1, among many others.

In step 808, the display environment is transitioned to include a second abstraction (e.g., second abstraction 404 of FIG. 5, second abstraction 504 of FIG. 7, second abstraction 604 of FIG. 9). As an example, the display environment can be transitioned using one or more of the media engines 116-1, 116-2, 116-n, such as a presentation engine configured to render menus and other graphics within a display environment for display on a display device. In various implementations, the transition can include a fade, a wipe, a pixilation, a reveal, or a page turn, among many others.

Figure 12:
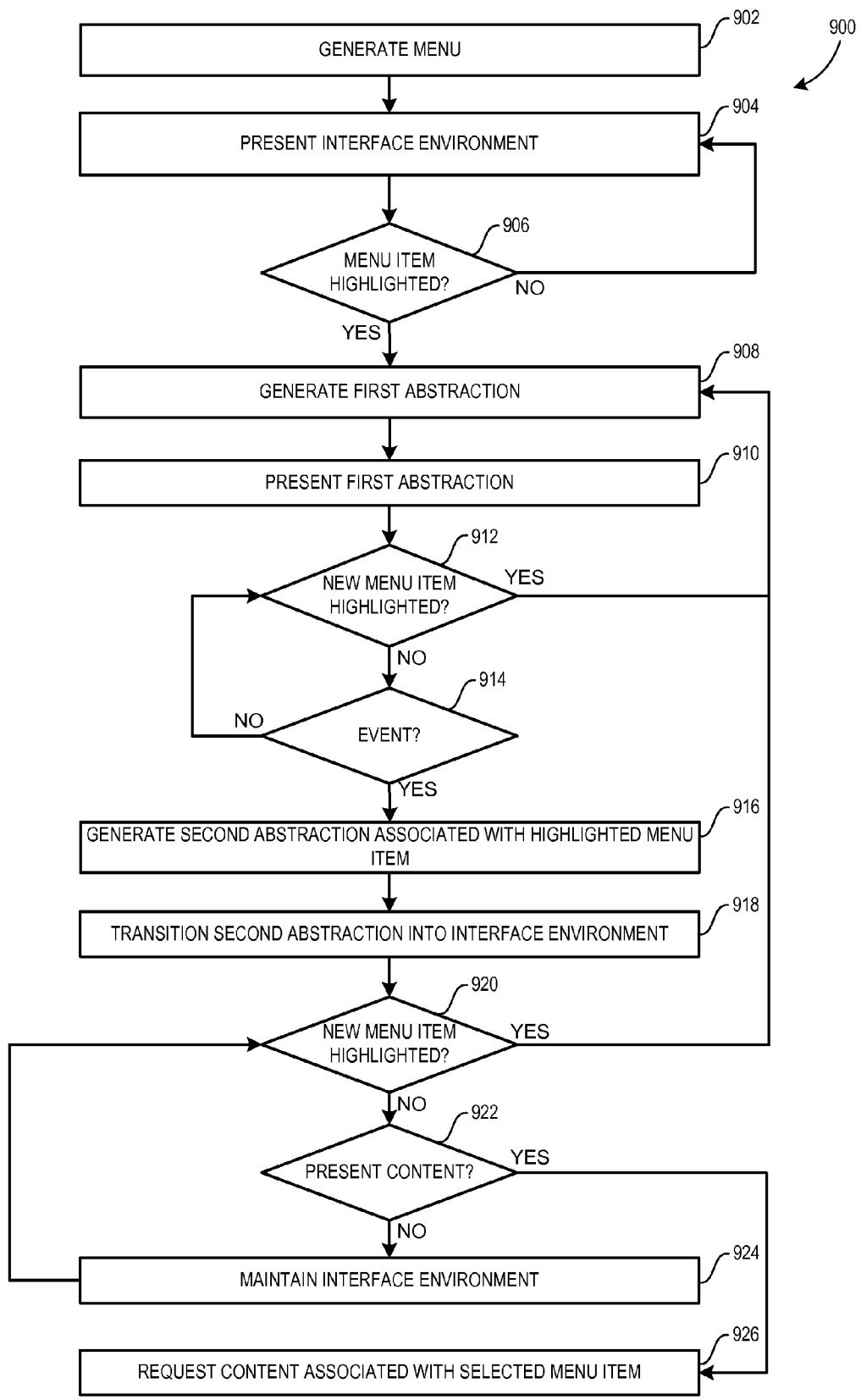

FIG. 12 is a flow diagram of another example media presentation process 900. In step 902, a menu is generated. As an example, the menu (e.g., menu 302 of FIGS. 4-9) can be generated by a user interface engine 114 of FIG. 1. Alternatively, the menu can be generated by one or more of the media engines 116-1, 116-2, 116-n. In various implementations, the menu can include a list of menu items. The list of menu items are associated with available content (e.g., stored content, downloadable content, video content, audio content, etc.).

In step 904, an interface environment is presented. The interface environment can include the generated menu from step 902. As an example, step 904 can be provided by one or more of the media engines 116-1, 116-2, 116-n of FIG. 1, such as by using a presentation engine configured to render graphics and menus such as an interface environment to a display device. The interface environment can also enable the user to move a highlight between menu items arranged within the menu (e.g., menu 302 of FIGS. 4-9).

In step 906, it is determined whether a menu item is highlighted. As an example, step 906 can be provided by one or more of the media engines 116-1, 116-2, 116-n of FIG. 1. If it is determined that no menu item is highlighted, the process 900 returns to step 904 and presents the interface environment.

However, if it is determined that a menu item is highlighted, the process 900 advances to step 908, where a first abstraction is generated. The first abstraction is typically associated with content represented by the highlighted menu item (e.g., 306, FIGS. 4-9). As an example, step 908 can be performed by one or more of the media engines 116-1, 116-2, 116-n of FIG. 1, such as a presentation engine configured to retrieve data and generate a digital representation of the first abstraction. In various examples, the first abstraction can include digital representation of promotional media associated with the content, such as, for example, movie poster(s), production still(s), metadata, movie trailer(s), video clips, etc., or combinations thereof. In various implementations, the first abstraction can include both a digital representation of a movie poster and metadata associated with the content corresponding to the highlighted menu item 306 of FIGS. 4-9. Moreover, step 908, in some implementations, can include rendering the generated graphical structures to a display device.

In step 912, the process 900 determines whether a new menu item is highlighted. Step 912 can be performed, for example, by a user interface engine 114 of FIG. 1. If a new menu item has been highlighted, the process 900 returns to step 908 to generate a new first abstraction.

However, if no new menu item has been highlighted, the process 900 advances to step 914, where it is determined whether an event has been received. In some examples, an event can be received using a user interface 114 of FIG. 1. In other examples, an event can be generated by one or more of the media engines 116-1, 116-2, 116-n based upon any of a variety of stimuli. For example, an internally generated event can include determining that the highlighting cursor has rested upon the same menu item for a predetermined time (e.g., a few seconds). If no event has been received, the process 900 returns to step 912 (discussed above).

If an event has been received, the process advances to step 916, where a second menu item abstraction is generated. As an example, step 916 can be performed by on of the media engines 116-1, 116-2, 116-n of FIG. 1, such as a presentation engine configured to retrieve data and render menus and graphics based upon the retrieved data. In various examples, the second abstraction can include digital representation of promotional media associated with the content, such as, for example, movie poster(s), production still(s), metadata, movie trailer(s), video clips, etc.

In step 918, the second abstraction can be transitioned into the interface environment. As an example, the second abstraction can be transitioned into the interface environment using one or more of the media engines 116-1, 116-2, 116-n, such as a presentation engine configured to render menus and other graphics within a display environment for display on a display device. In various implementations, the transition can include a fade, a wipe, a pixilation, a reveal, or a page turn, among many others. In some example implementations, steps 912-918 are optional based upon the configuration of the first abstraction.

In step 920, it is determined whether a new menu items has been highlighted. Step 920 can be performed, for example, by a user interface engine 114 of FIG. 1. If a new menu item has been highlighted, the process 900 returns to step 908 to generate a new first abstraction.

However, if no new menu item has been highlighted, the process 900 advances to step 922, where it is determined whether a request to present the content has been received. In some examples, a request to present content can be received using a user interface 114 of FIG. 1. If no request to present content has been received, the process 900 advances to step 924, where the interface environment is maintained. As an example, the interface environment can be maintained by one or more of the media engines 116-1, 116-2, 116-n, such as a presentation engine configured to retrieve data and render menus and graphics based upon the retrieved data.

Returning to step 922, if a request to present content has been received, the process 900 advances to step 926, where a request is issued to present content associated with a menu item. The request can be issued, for example, by a user interface 114. The request can be sent, for example, to one or more media engines 116-1, 116-2, 116-n, such as, for example, a content retrieval engine configured to receive content requests and search a data store 102 or a network 212 for a content provider 214-1, 214-2 providing content associated with the content request.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

What is claimed is:

1. A computer-implemented method, comprising:
    displaying a menu arranged in an interface environment, the menu comprising a list of menu items, each of the menu items associated with corresponding video content;
    in response to a first user input that causes one of the displayed menu items to be highlighted:
        highlighting the menu item;
        displaying in the interface environment and proximate to the menu only a first abstraction of the highlighted menu item, the first abstraction having a first size and being a first representation of the video content associated with the highlighted menu item;
        determining that the highlighted menu item has been highlighted for a predetermined time period, and in response to the determination:
            scaling the first abstraction to a second size different from the first size;
            transitioning a second abstraction of the highlighted menu item into the interface environment proximate to the scaled first abstraction, the second abstraction only displayed with the scaled first abstraction and being a second representation of the video content associated with the highlighted menu item; and
    in response to a second user input being a selection of a highlighted menu item, presenting the video content associated with the highlighted menu item.

2. The computer-implemented method of claim 1, wherein the first abstraction comprises art.

3. The computer-implemented method of claim 2, wherein the art comprises a digital representation of at least one of a movie poster associated with the highlighted menu item, production stills associated with the highlighted menu item, or promotional media associated with the highlighted menu item.

4. The computer-implemented method of claim 1, wherein the first abstraction comprises metadata.

5. The computer-implemented method of claim 4, wherein the metadata comprises information about content related to the highlighted menu item.

6. The computer-implemented method of claim 5, wherein the information includes a digital representation of at least one of a movie poster associated with the highlighted menu item, production stills associated with the highlighted menu item, or promotional media associated with the highlighted menu item.

7. The computer-implemented method of claim 1, wherein the second abstraction includes metadata associated with the highlighted menu item.

8. The computer-implemented method of claim 7, wherein the metadata comprises information about content related to the highlighted menu item.

9. The computer-implemented method of claim 8, wherein the information comprises at least one of a title associated with the highlighted menu item, an actor associated with the highlighted menu item, a director associated with the highlighted menu item, a producer associated with the highlighted menu item, a summary description associated with the highlighted menu item, a release date associated with the highlighted menu item, a genre associated with the highlighted menu item, a rating associated with the highlighted menu item, a runtime associated with the highlighted menu item, or combinations thereof.

10. The computer-implemented method of claim 1, wherein the second abstraction comprises a content preview associated with the highlighted menu item.

11. The computer-implemented method of claim 10, wherein the second abstraction further comprises metadata associated with the highlighted menu item.

12. The computer-implemented method of claim 11, wherein the metadata comprises at least one of a title associated with the highlighted menu item, an actor associated with the highlighted menu item, a director associated with the highlighted menu item, a producer associated with the highlighted menu item, a summary description associated with the highlighted menu item, a release date associated with the highlighted menu item, a genre associated with the highlighted menu item, a rating associated with the highlighted menu item, a runtime associated with the highlighted menu item, or combinations thereof.

13. The computer-implemented method of claim 1, wherein the list of menu items arranged in the menu is maintained after the transition.

14. One or more computer non-transitory readable media storing instructions that are executable by a processing device, and upon such execution cause the processing device to perform operations comprising:
    generating a interface environment comprising a menu, the menu comprising a plurality of menu items, each of the menu items associated with corresponding video content;
    in response to a first user input that causes one of the displayed menu items to be highlighted: highlighting the menu item;
    displaying in the interface environment and proximate to the menu only a first abstraction of the highlighted menu item, the first abstraction having a first size and being a first representation of the video content associated with the highlighted menu item;
    determining that the highlighted menu item has been highlighted for a predetermined time period, and in response to the determination:
    scaling the first abstraction to a second size different from the first size; and
    transitioning a second abstraction of the highlighted menu item into the interface environment proximate to the scaled first abstraction, the second abstraction being a second representation of the video content associated with the highlighted menu item and only being displayed with the scaled first abstraction; and
    in response to a second user input being a selection of a highlighted menu item, presenting the video content associated with the highlighted menu item.

15. The non-transitory computer readable media of claim 14, wherein the first abstraction comprises art.

16. The non-transitory computer readable media of claim 15, wherein the art comprises a digital representation of at least one of a movie poster associated with the highlighted menu item, production stills associated with the highlighted menu item, or promotional media associated with the highlighted menu item.

17. The non-transitory computer readable media of claim 14, wherein the first abstraction comprises metadata.

18. The non-transistory computer readable media of claim 17, wherein the metadata comprises information about content related to the highlighted menu item.

19. The non-transistory computer readable media of claim 18, wherein the information includes a digital representation of at least one of a movie poster associated with the highlighted menu item, production stills associated with the highlighted menu item, or promotional media associated with the highlighted menu item.

20. The non-transistory computer readable media of claim 14, wherein the second abstraction includes metadata associated with the highlighted menu item.

21. The non-transistory computer readable media of claim 20, wherein the metadata comprises information about content related to the highlighted menu item.

22. The non-transistory computer readable media of claim 14, wherein the second abstraction comprises a content preview associated with the highlighted menu item.

23. The non-transistory computer readable media of claim 22, wherein the second abstraction further comprises metadata associated with the highlighted menu item.

24. The non-transistory computer readable media of claim 23, wherein the metadata comprises at least one of a title associated with the highlighted menu item, an actor associated with the highlighted menu item, a director associated with the highlighted menu item, a producer associated with the highlighted menu item, a summary description associated with the highlighted menu item, a release date associated with the highlighted menu item, a genre associated with the highlighted menu item, a rating associated with the highlighted menu item, a runtime associated with the highlighted menu item, or combinations thereof.

25. The non-transistory computer readable media of claim 14, wherein the menu is maintained in the display environment after the transition.

* * * * *

UNITED STATES PATENT AND TRADEMARK OFFICE
CERTIFICATE OF CORRECTION

PATENT NO. : 7,853,972 B2
APPLICATION NO. : 11/530630
DATED : December 14, 2010
INVENTOR(S) : Rainer Brodersen et al.

It is certified that error appears in the above-identified patent and that said Letters Patent is hereby corrected as shown below:

On sheet 3 of 6, in Figure 6, Box. 302, line 5, delete "Carribbean" and insert -- Caribbean --, therefor.

On sheet 3 of 6, in Figure 7, Box. 302, line 5, delete "Carribbean" and insert -- Caribbean --, therefor.

On sheet 3 of 6, in Figure 8, Box. 302, line 5, delete "Carribbean" and insert -- Caribbean --, therefor.

On sheet 4 of 6, in Figure 9, Box. 302, line 5, delete "Carribbean" and insert -- Caribbean --, therefor.

In column 12, line 28, in claim 14, delete "transistory" and insert -- transitory --, therefor.

In column 12, line 58, in claim 15, delete "transistory" and insert -- transitory --, therefor.

In column 12, line 60, in claim 16, delete "transistory" and insert -- transitory --, therefor.

In column 12, line 66, in claim 17, delete "transistory" and insert -- transitory --, therefor.

In column 13, line 1, in claim 18, delete "transistory" and insert -- transitory --, therefor.

In column 13, line 4, in claim 19, delete "transistory" and insert -- transitory --, therefor.

In column 13, line 10, in claim 20, delete "transistory" and insert -- transitory --, therefor.

In column 13, line 13, in claim 21, delete "transistory" and insert -- transitory --, therefor.

In column 13, line 16, in claim 22, delete "transistory" and insert -- transitory --, therefor.

In column 14, line 1, in claim 23, delete "transistory" and insert -- transitory --, therefor.

In column 14, line 4, in claim 24, delete "transistory" and insert -- transitory --, therefor.

Signed and Sealed this
Twenty-fifth Day of October, 2011

David J. Kappos
*Director of the United States Patent and Trademark Office*

CERTIFICATE OF CORRECTION (continued)
U.S. Pat. No. 7,853,972 B2

In column 14, line 15, in claim 25, delete "transistory" and insert -- transitory --, therefor.